US012359916B2

(12) United States Patent
 Sabater (10) Patent No.: US 12,359,916 B2
(45) Date of Patent: Jul. 15, 2025

(54) NONLINEAR FREQUENCY MODULATED GYROSCOPE

(71) Applicant: Naval Information Warfare Center Pacific, San Diego, CA (US)

(72) Inventor: Andrew B. Sabater, San Diego, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 340 days.

(21) Appl. No.: 18/063,124

(22) Filed: Dec. 8, 2022

(65) Prior Publication Data
 US 2024/0191995 A1   Jun. 13, 2024

(51) Int. Cl.
| G01C 19/5776 | (2012.01) |
| G01C 25/00 | (2006.01) |
| G01K 7/18 | (2006.01) |
| G01K 7/22 | (2006.01) |
| G05D 23/24 | (2006.01) |
| H05B 1/02 | (2006.01) |

(52) U.S. Cl.
 CPC ....... *G01C 19/5776* (2013.01); *G01C 25/005* (2013.01); *G01K 7/18* (2013.01); *G01K 7/22* (2013.01); *G05D 23/24* (2013.01); *H05B 1/023* (2013.01)

(58) Field of Classification Search
 CPC .. G01C 19/5776; G01C 25/005; G01C 19/56; G01C 21/183; G01C 25/00; G01C 19/5684; G01C 19/5726; G01C 21/20; G01K 7/18; G01K 7/22; G01K 7/42; G05D 23/24; G05D 23/1917; H05B 1/023; G01P 21/00; H03H 2003/027; H03H 3/04; H03H 3/0077; H03H 9/02259; H03H 9/02448; H03H 9/2452; H03H 9/2463; H03H 9/17
 See application file for complete search history.

(56) References Cited

U.S. PATENT DOCUMENTS

| 11,835,339 | B1* | 12/2023 | Sorenson | G01C 19/5776 |
| 2018/0245946 | A1* | 8/2018 | Weinberg | G01C 19/5684 |
| 2021/0270608 | A1* | 9/2021 | Zhou | G01C 25/005 |

* cited by examiner

*Primary Examiner* — Timothy P Graves
(74) *Attorney, Agent, or Firm* — Naval Information Warfare Center Pacific; Kyle Eppele; Matthew D. Pangallo (57) ABSTRACT

A nonlinear frequency modulated gyroscope includes a degenerate-mode mechanical resonator, positive feedback circuits, a temperature control component, and a gyroscope controller. The degenerate-mode mechanical resonator with two or more modes are coupled via a Coriolis effect. The positive feedback circuits for each mode of the degenerate-mode mechanical resonator include an analog or digital automatic gain control that maintains oscillations of each mode at a constant amplitude. The temperature control component includes a sensor and heating elements. The gyroscope controller is an application-specific integrated circuit, a field programmable gate array, or microcontroller. The degenerate-mode mechanical resonator, the positive feedback circuits, and the temperature control component are subsystems of the nonlinear frequency modulated gyroscope.

15 Claims, 7 Drawing Sheets

NONLINEAR FREQUENCY MODULATED GYROSCOPE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Naval Information Warfare Center Pacific, Code 72120, San Diego, CA, 92152; (619) 553-5118; NIWC_Pacific_T2@us.navy.mil. Reference Navy Case Number 210864.

BACKGROUND

Inertial navigation provides a means to navigate independent of global positioning satellites (GPS) and is immune to issues related to the use of a GPS. Inertial navigation is based on fusing measurements from accelerometers and gyroscopes to estimate position, velocity, and attitude. Frequency modulated (FM) gyroscopes are microelectromechanical (MEMS) sensors that exploit an angular momentum conservation effect to sense rotation versus the Coriolis effect that is used with amplitude modulated (AM) gyroscopes. FM gyroscopes provide an estimate for the rotation rate and this estimate of rotation rate typically has the best long-term stability when the amplitude of the drive mode and sense mode are equal.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

In theory, current FM gyroscopes should be immune to effects that might cause the frequency of the constituent oscillators to drift from, for example, temperature variation or packaging material aging. However, in the absence of constant temperature control, FM gyroscopes have been shown to drift. Current high-performance MEMS gyroscopes have a bias instability (metric to quantify drift) of 1°/hr. To address this, FM gyroscopes have been integrated with other navigation sensors or navigation systems, such as GPS. However, certain navigation systems (e.g., GPS) are limited to specific applications. For example, GPS cannot be received below water. Other attempts to address the drift use optical gyroscopes, which are complex and costly. Therefore, optical gyroscopes can only be in used limited applications.

The nonlinear FM gyroscopes herein include subsystems that provides amplitude and temperature control to correct for bias drift. The FM gyroscope includes two components to maintain a constant amplitude and temperature. A pair of positive feedback circuits are used maintain a constant amplitude. A temperature control component maintains a constant temperature within the gyroscope. These components can be implemented with current MEMS gyroscopes to enhance various stability metrics such as bias instability or scale factor stability. Therefore, the nonlinear FM gyroscope herein can be used in many applications, including in underwater environments. Additionally, the components are inexpensive and straightforward, which allows the gyroscopes to be implemented in many different platforms, rather than being limited to high-value platforms.

A nonlinear frequency modulated gyroscope includes a degenerate-mode mechanical resonator, positive feedback circuits, a temperature control component, and a gyroscope controller. The degenerate-mode mechanical resonator with two or more modes are coupled via a Coriolis effect. The positive feedback circuits for each mode of the degenerate-mode mechanical resonator include an analog or digital automatic gain control that maintains oscillations of each mode at a constant amplitude. The temperature control component includes a sensor and heating elements. The gyroscope controller is an application-specific integrated circuit, a field programmable gate array, or microcontroller. The degenerate-mode mechanical resonator, the positive feedback circuits, and the temperature control component are subsystems of the nonlinear frequency modulated gyroscope.

Figure 1:
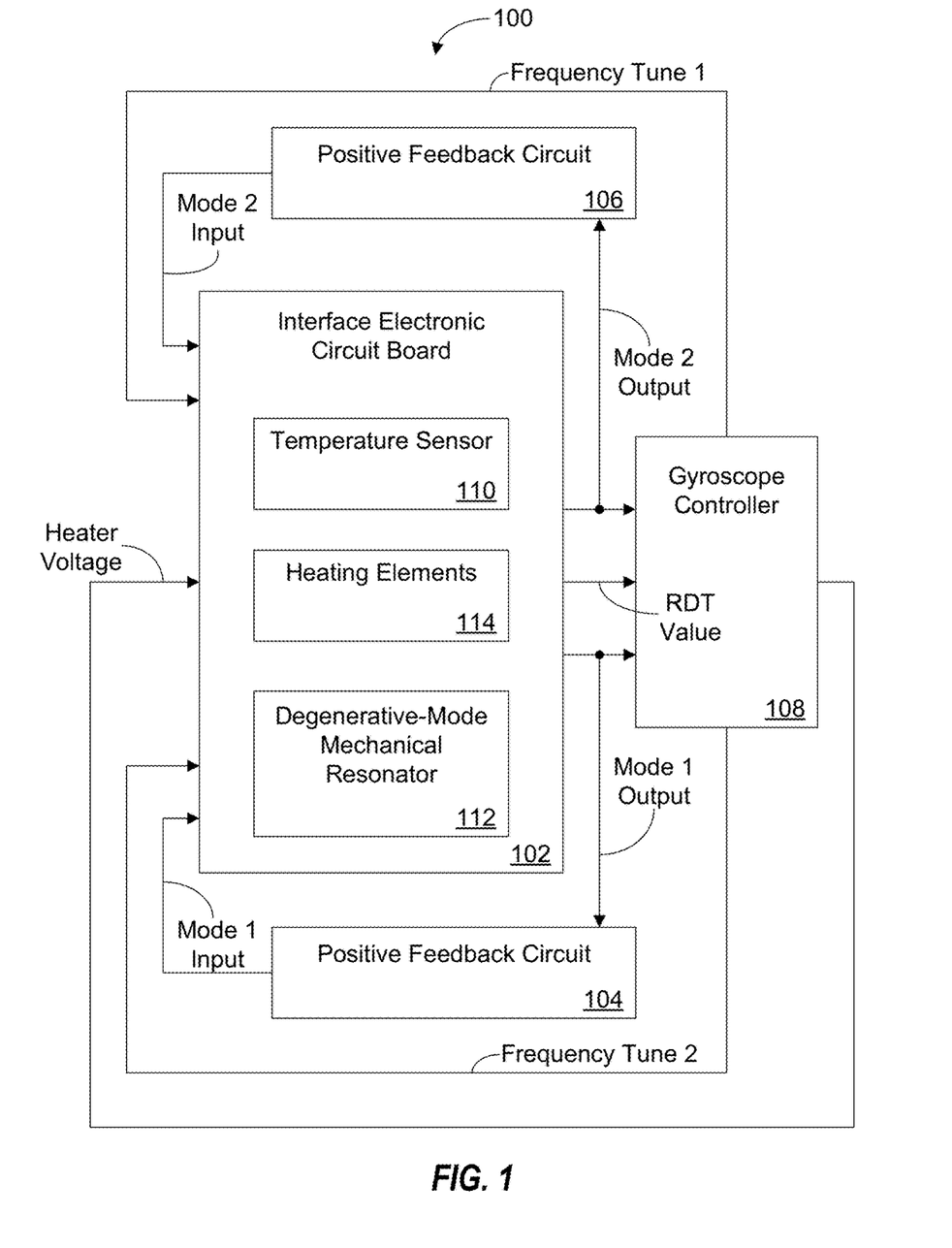
FIG. 1 is a diagram of an example of a nonlinear frequency modulated gyroscope.

Referring now to FIG. 1, a diagram of an example of a nonlinear FM gyroscope 100 is shown. An interface electronic circuit board 102 includes a temperature sensor 110, a degenerative-mode mechanical resonator 112, and heating elements 114. The interface electronic circuit board 102 design varies depending on the application. However, the interface electronic circuit board fulfills specific functions. The function of the interface electronic circuit board 102 is to provide electrical connections to components within the package 308 (discussed in detail herein), convert the charge output of the degenerate mode mechanical resonator 112 to a voltage, and hold the components needed for temperature control, such as an electronic circuit for the temperature sensor, to digitize the output of the temperature sensor 110.

The temperature sensor 110 and heating elements 114 together form the temperature control component. The temperature control component monitors and maintains a constant temperature by heating the nonlinear FM modulated gyroscope to a set temperature. Under a constant temperature in the nonlinear FM gyroscope 100, frequency drift is correlated with frequency split drift. This allows measurements to be taken from the nonlinear FM modulated gyroscope 100 to have a bias instability, as quantified by Allen Deviation methods, to be equal to or less than 10°/hr for periods of time greater 100 seconds and validated up to time scales on the order of 10,000 seconds or several hours. The temperature sensor 110 measures the temperature via a change in resistance of a discrete component placed close to the degenerate mode mechanical resonator 112. In an example, the temperature sensor 110 is a platinum resistance temperature device or a thermistor. In another example, the temperature sensor 110 may be a circuit that records resistance measurements and converts the measurements to digital data that a microcontroller can read and convert into temperature data.

The heating elements 114 are used to heat the nonlinear FM modulated gyroscope 100 to assist in maintaining a constant temperature by adding heat. An example of the heating elements 114 is power resistors. In order for the heating elements 114 to function, the temperature for the heating elements 114 to activate is set above the environmental temperature the nonlinear FM modulated gyroscope 100 is used in. In some examples, the temperature control component including the temperature sensor 110 and the heating elements 114 can be attached to the interface electronic circuit board 102 (e.g., epoxied to the bottom of the interface electronic circuit board 102), a chip carrier, or integrated into the degenerative-mode mechanical resonator 112 to reduce measurement bias.

The degenerative-mode mechanical resonator 112 includes at least two modes where the two or more modes can be coupled via a Coriolis Effect. In other examples, the degenerative-mode mechanical resonator 112 can have as many modes as functionally possible. In one example, the degenerative-mode mechanical resonator 112 includes a plurality of shaped combs with control loops in an amount equal to the number of modes to maintain a mean or an average frequency of each mode at a constant value. In another example, the degenerative-mode mechanical resonator 112 includes a plurality of shaped combs with at least one control loop to maintain a difference in a mean or an average modal frequency at a constant value. In the example shown in FIG. 1, there would be two control loops for each mode (i.e., mode 1 and mode 2). In the example shown in FIG. 1, the degenerate-mode mechanical resonator 112 is attached to a chip carrier and connected to the interface electronics circuit board 102. In addition, the interface electronic circuit board 102 along with degenerate-mode mechanical resonator 112 is enclosed in a vacuum chamber.

Referring back to FIG. 1, the example of the nonlinear FM gyroscope 100 includes two positive feedback circuits 104, 106. In some examples, there is a positive feedback circuit for every mode used in the degenerate-mode mechanical resonator 112. For example, if there are six modes used in the degenerate-mode mechanical resonator 112, there are six positive feedback circuits. In other examples, more positive feedback circuits may be used depending on the application. The positive feedback circuits 104, 106 include an analog or digital automatic gain control circuit that maintains oscillations of each mode at a constant amplitude. In FIG. 1, the first positive feedback circuit 104 has an input and output (labeled "Mode 1 input" and "Mode 1 output"). The second positive feedback circuit 106 also has an input and output (labeled "Mode 2 input" and "Mode 2 output"). The example shown in FIG. 1 shows an analog automatic gain control circuit where the positive feedback circuits 104, 106 operate distinct from the gyroscope controller 108 and independently maintain oscillations of each mode at a constant amplitude. In another example (not shown in FIG. 1), a digital automatic gain control circuit may be used where the gyroscope controller 108 provides inputs to the positive feedback circuits 104, 106 to maintain oscillations of each mode at a constant amplitude.

Figure 2:
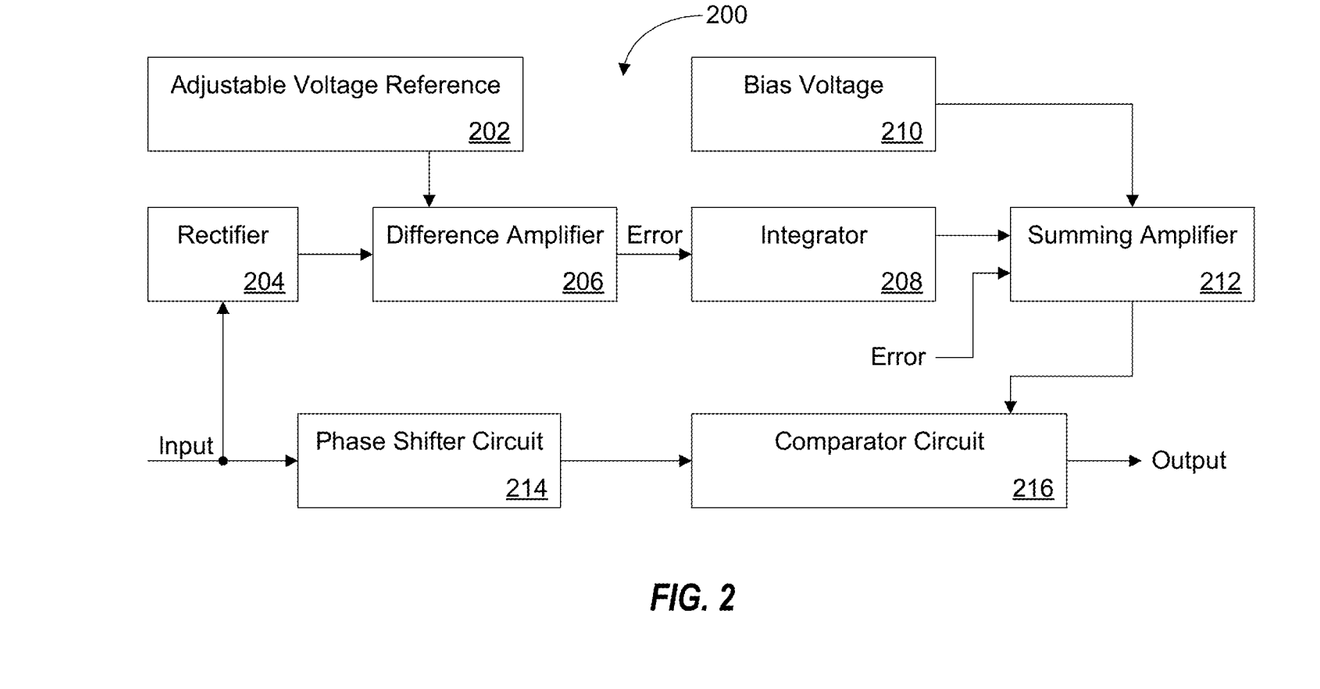
FIG. 2 is a diagram of an example of a positive feedback circuit of the nonlinear frequency modulated gyroscope.

Referring now to FIG. 2, a diagram of an example of an individual positive feedback circuit 200 is shown. In FIG. 2, to maintain oscillations of the degenerate-mode mechanical resonator 112, a phase shifter circuit 214 is connected to a comparator circuit 216 that adjusts a phase output and an amplitude output of each mode of the degenerate-mode resonator 112 to self-oscillate. In one example, the analog or digital automatic control circuit adjusts the amplitude output of the comparator circuit 216 by using proportional-integral (PI) control. Either an analog or digital automatic gain control circuit can implement the PI control algorithm to adjust the amplitude output. An example of an analog automatic control circuit is used in FIG. 2.

For example, the phase shifter circuit 214 could be an active all-pass filter, a passive phase shifter, or a high-pass filter depending on the noise, power consumption, and design complexity requirements of the nonlinear frequency modulated gyroscope 100. The input of the phase shifter circuit 214 is also connected to the input of a rectifier 204, which is a "super diode" with a low-pass filer used to measure the amplitude of the given mode. A difference amplifier 206 adjusts the amplitude output by determining the difference or error in voltage between the value from the rectifier 204 and the desired value set by an adjustable voltage reference 202. The difference amplifier 206 is connected to an integrator 208 that integrates amplitude error. The error, integrated error, and bias voltage 210 is connected to a summing amplifier 212 that adjusts the amplitude output of the comparator 216 by changing the supply voltages. The comparator circuit 216 includes an attenuator to adjust the amplitude output to within the needed range based on, for example, expected temperature variation to maintain operation of the amplitude at the voltage set by bias reference 210 or to compensate for limits of the comparator 216. In an example, if the comparator circuit 216 is optimized for supply voltages of −5 V and 5 V, the comparator circuit 216 turns off when the difference in supply voltage is less than 2 V. An attenuator is needed if the bias reference 202 or desired amplitude is set to 1 V, and the input voltage amplitude for that mode is close to 100 mV.

Referring back to FIG. 1, the nonlinear frequency modulated gyroscope 100 includes a gyroscope controller 108. In an example, the gyroscope controller 108 is a computer processor, either an application-specific integrated circuit, a field programmable gate array, or microcontroller that can be used to measure output of the voltages from the interface electronics circuit board 102. The gyroscope controller 108 must be able to measure these voltages fast enough and with sufficient resolution to provide accurate frequency demodulation. The gyroscope controller 108 then can process this voltage data to estimate a rotation rate, store or further processes this data using either simple linear models with known correlated features to improve long-term stability or implement autoregressive filters to improve short-term stability. This data process can also be used to adjust the voltages applied to the shape combs on the degenerative-mode mechanical resonator 112 or control positive feedback circuits 104, 106 for digital amplitude control.

Figure 3:
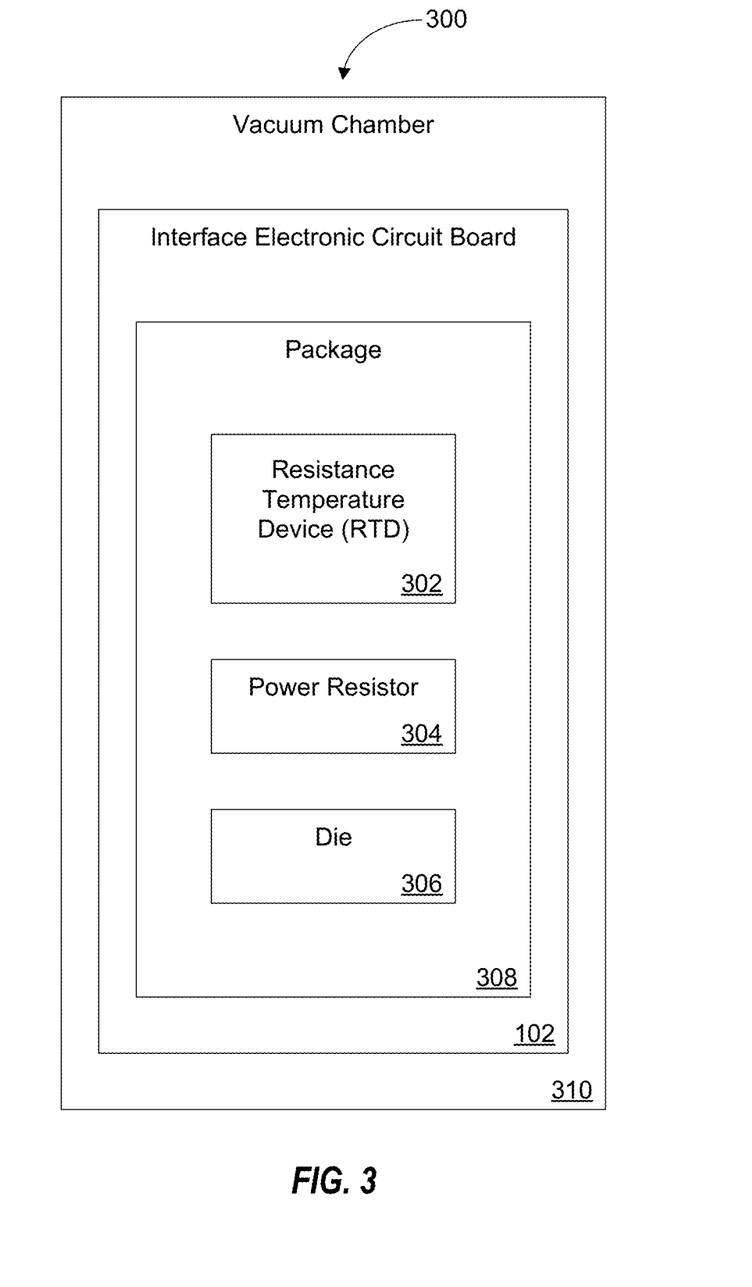
FIG. 3 is a diagram of an experimental setup to test a degenerate mode mechanical resonator of the nonlinear frequency modulated gyroscope.

Referring now to FIG. 3, a diagram of an example of an experimental implementation of the nonlinear frequency modulated gyroscope 300 is shown. The experimental implementation 300 includes the interface electronics board 102, which includes the degenerate-mode mechanical resonator 112, the positive feedback circuits 104, 106, and the temperature control components as subsystems of the nonlinear frequency modulated gyroscope 100 (not depicted in FIG. 3). In addition, the interface electronics board 102 includes a package 308 with an RTD (resistance temperature device) 302, a power resistor 304 (a temperature control component), and a die 306. Enclosing the interface electronics board 102 and the package 308 with the RTD 302, the power resistor 304, and the die 306 is a vacuum chamber 310.

A nonlinear frequency modulated gyroscope system is also disclosed herein. The system includes the same degenerate-mode mechanical resonator 112, positive feedback circuits 104, 106, and the temperature control components as previously described herein. Similarly, the degenerate-mode mechanical resonator 112, positive feedback circuits 104, 106, and the temperature control components are subsystems of the nonlinear frequency modulated gyroscope system.

Figure 4:
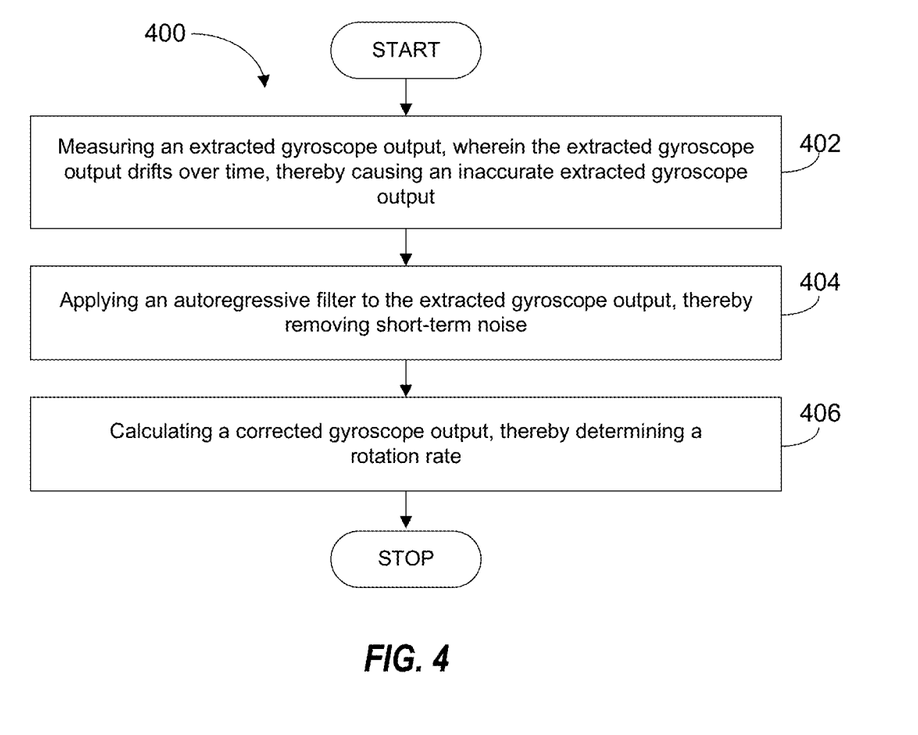
FIG. 4 is an example of a method for real-time frequency modulated bias calibration of short-term drift in a nonlinear frequency modulated gyroscope.

Referring now to FIG. 4, an example of a method 400 for real-time frequency modulated bias calibration of short-term drift in a nonlinear frequency modulated gyroscope is shown. In the method 400, an extracted gyroscope output is measured 302 where the extracted gyroscope output drifts over time, thereby causing an inaccurate extracted gyroscope output. The drift occurs because effects that cause the frequency of one mode to drift, for example temperature variations, can be very challenging to be separated from effects that cause the estimated rotation rate to drift. For example, while in theory synchronous demodulation should allow for perfect rejection of quadrature error, or error due misalignment of the Coriolis-coupled modes of the degenerate mode resonator 112, in practice demodulation errors can occur for many reasons such as timing errors. As quadrature error is often greater than the rate signal and temperature dependent, a constant temperature control can reduce the impact of quadrature variation. In an example, the extracted output of the gyroscope is obtained measuring an output of an interface electronic circuit board 102 that corresponds to a displacement of two Coriolis-coupled modes of the degenerate mode resonator 112, a differential charge produced by motion of the two modes, or a combination thereof. In some examples, the measurement may be further processed to obtain the final extracted output of the gyroscope prior to using the autoregressive filter.

Referring back to FIG. 3, the method 400 further includes applying an autoregressive filter to the extracted gyroscope output 304, thereby removing short-term noise. The autoregressive filter removes or filters stationary noise processes from the extracted accelerometer output. The autoregressive filter is applied using the following equation (V):

$$y_t = \delta_0 + \delta_1 t + \sum_{k=0}^{p} \phi_k y_{t-k} + \epsilon_t \quad (V)$$

where t is time, $\delta_0$ is linear offset, $\delta_1$ is linear trend with time, p is an autoregressive model order, $\phi_k$ is an autoregressive model parameter, $y_{t-k}$ is a model value at discrete time (t-k), k is a k-th term of the summation, and $\epsilon_t$ is uncorrelated noise process at discrete time t. In some examples, the autoregressive filter is fit to an autoregressive model that automatically selects the model order based on an Akaike information criterion. In another example, the autoregressive filter is fit to an autoregressive model that automatically selects the model order based on an Akaike information criterion, another metric that penalizes high model orders to minimize the potential of overfitting, or a combination thereof.

Referring back to FIG. 4, the method 400 includes calculating a corrected gyroscope output 306, thereby determining a rotation rate. The method 400 may be performed by a computer processor, an application-specific integrated circuit, a field programmable gate array, or a microcontroller. Specifically, a computer processor, an application-specific integrated circuit, a field programmable gate array, or a microcontroller is used to record a measurement of the extracted output of the gyroscope, apply the autoregressive filter, and calculate the corrected gyroscope output.

To further illustrate the present disclosure, examples are given herein. These examples are provided for illustrative purposes and are not to be construed as limiting the scope of the present disclosure.

EXAMPLES

To support rapid testing, parts were designed for and fabricated with using MEMSCAP's SOIMUMPS process. In this example, duel pendulum-style resonators were designed with the addition of shaped combs for frequency compensation. A total die area of 4.5 mm by 4.5 mm was allocated for each part, but the active area was restricted to less than 2 mm by 2 mm to mitigate potential issues during wet release. Based on the design rules of the process of a minimum feature spacing of 3 µm, a mask spot size of 0.25 µm, and potential over-etching of pointed features. The dies were bonded using a cyanoacrylate-based epoxy to a ceramic chip carrier and then wire bonded. For testing, the dies were then placed in the socket of an interface electronics board that was in turn placed in a vacuum chamber. The nominal pressure for most tests was under 10 mTorr. The parts were designed to have matching natural frequencies at about 4.5 kHz. However, due to over-etching, the natural frequency of the parts are closer to 4 kHz with frequency splits ranging from about 20 to 100 Hz. For the device utilized in this work, the frequency split was approximately 68 Hz.

Example 1: Dual Active Frequency Control

Figure 5A:
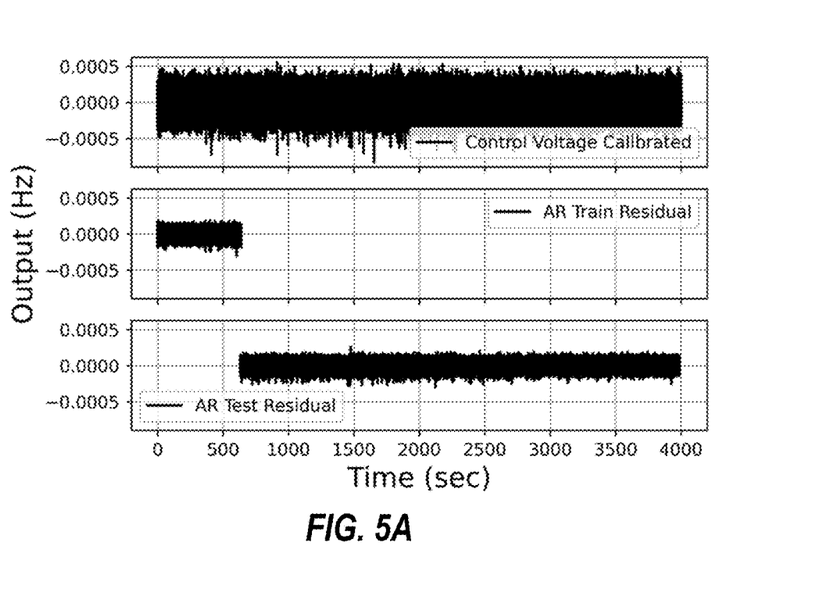
FIG. 5A-5B are a graph of the time series of a raw rate estimate and model residuals from training and testing the autoregressive model and a power spectral density of the raw sensor output and the model residual during testing, respectively.
Figure 5B:
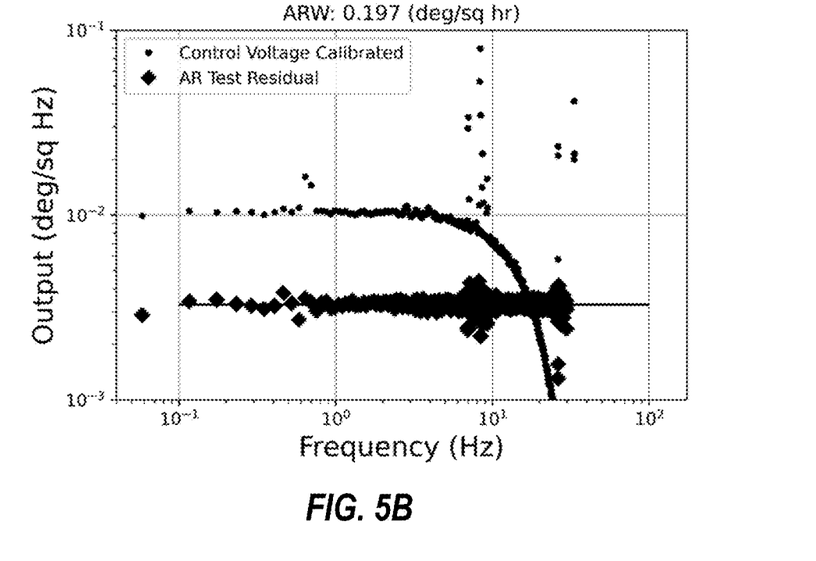

One significant advantage of dual active frequency control is removing non-stationary noise processes from the output of the sensor that can be further filtered using an autoregressive model. Shown in FIG. 5A is the time series of the output of the device under active amplitude and frequency control after temperature compensation (or control voltage compensation), as well as the model residuals from the time periods used for training and testing the model. Balancing the needs of preserving the bandwidth of the sensor and reducing the number of model coefficients, the data was decimated to a lower sampling rate of about 60 Hz. Shown in FIG. 5B are the power spectral densities of the raw sensor output and the model residual during the test phase. By using the autoregressive model to remove correlated noise processes, the few remaining peaks in the power spectral density are removed. As an added benefit, the short-term noise, quantified by angle random walk (ARW), is significantly reduced.

Figure 6:
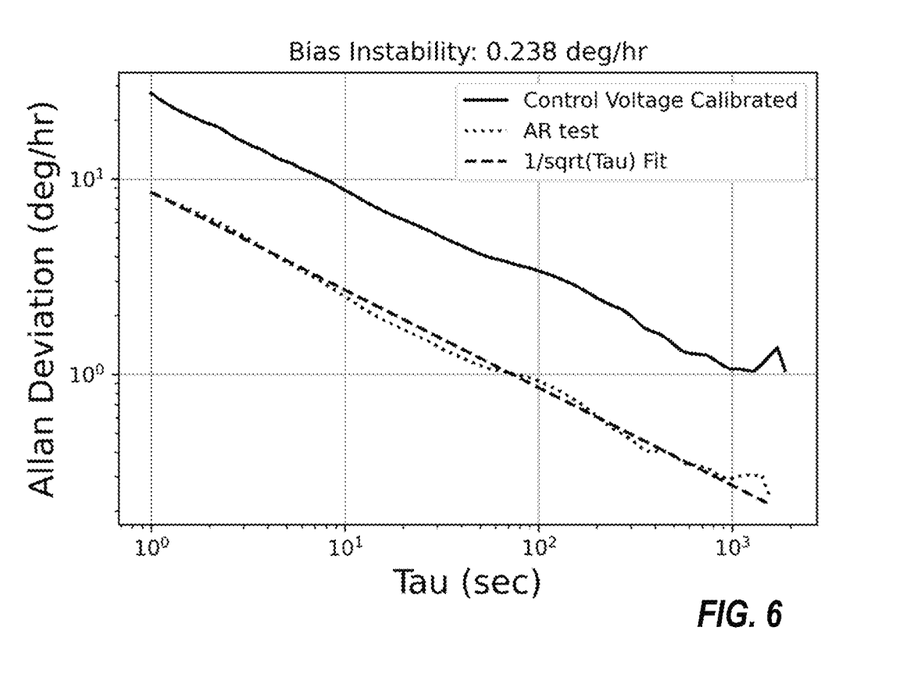
FIG. 6 is a graph of an Allen Deviation of the calibrated output, the model residuals during testing, and the fit to model residuals of the nonlinear frequency modulated gyroscope.

In FIG. 6, the zero rate output of the calibrated output, the model residual during the test phase, and the white noise fit to model residuals. The bias instability, reported as the minimum value of the Allen deviation, of the model residuals is about 0.2 deg/hr. Provided temperature compensated can be added, the estimated bias instability is projected to be less than 0.1 deg/hr.

Example 2: Temperature and Split Frequency Control

Figure 7:
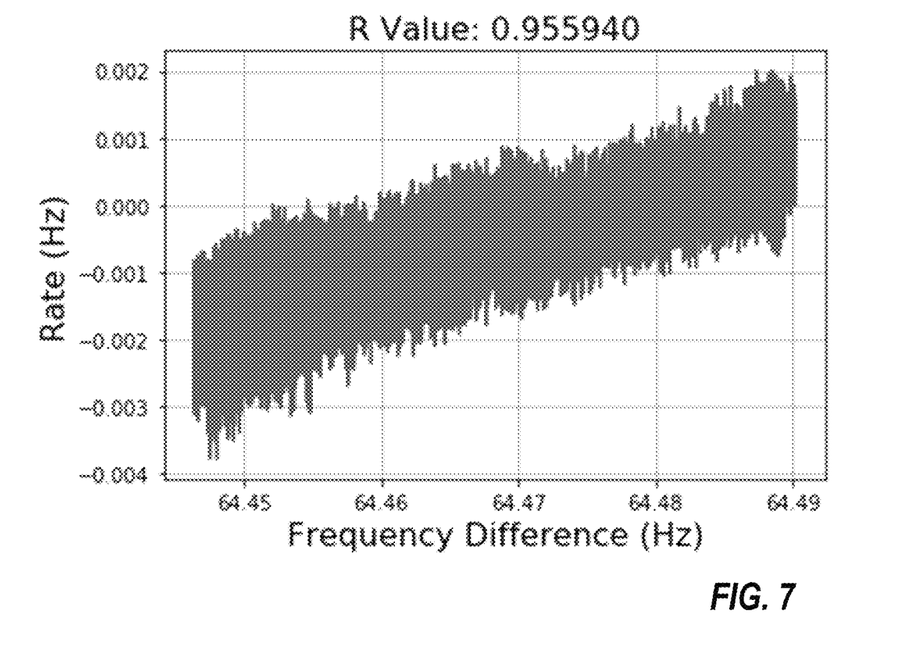
FIG. 7 is a graph of Rate (Hz) (Y-axis) vs. frequency difference (Hz) (X-axis) of the nonlinear frequency modulated gyroscope under constant temperature.
Figure 8:
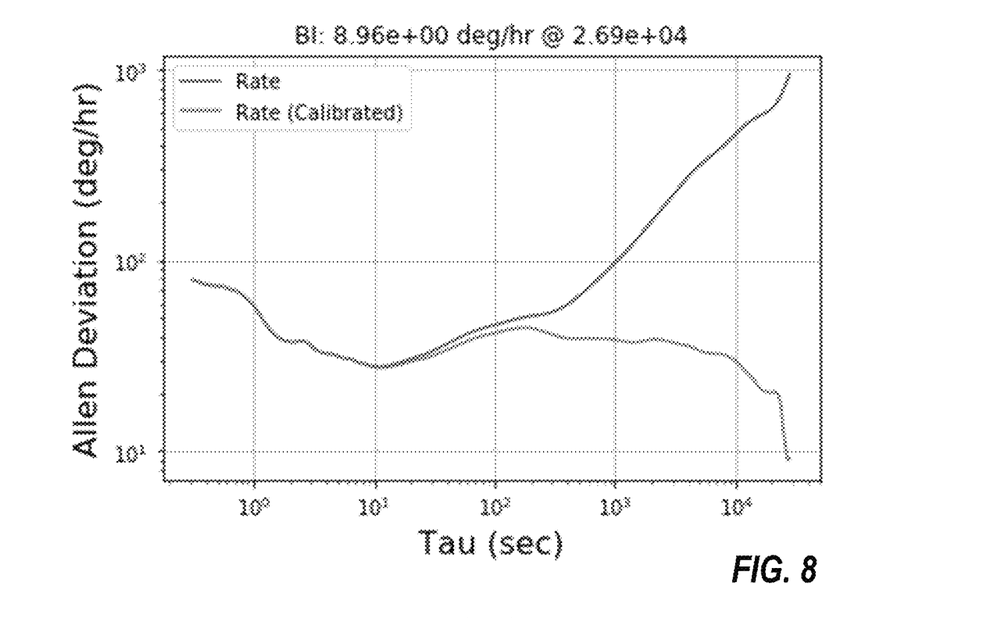
FIG. 8 is a graph of Allen Deviation (deg/hr) (Y-axis) vs. Tau (sec) (X-axis) of the raw and linearly compensated response via frequency split drift.
Figure 9:
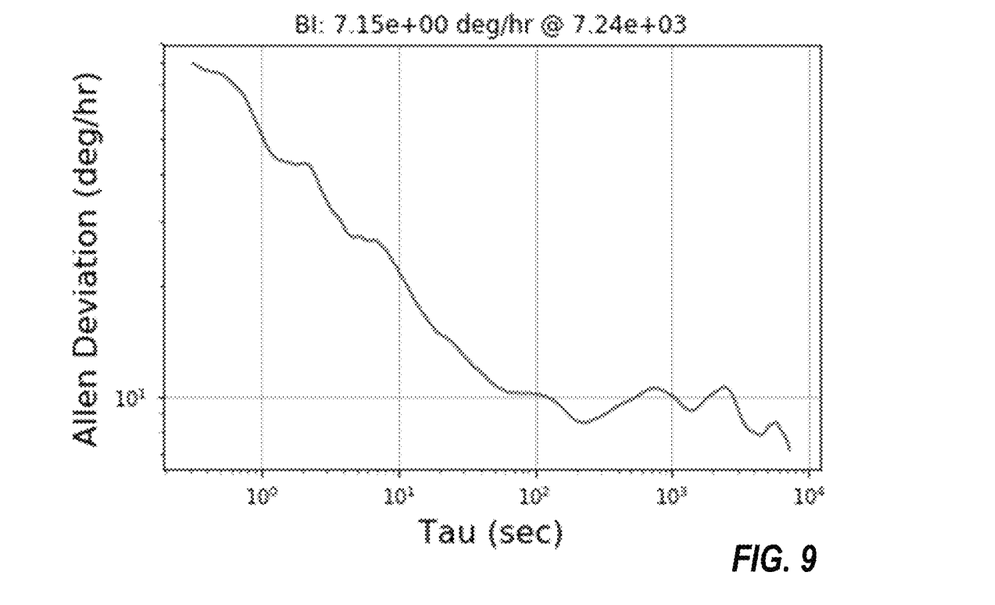
FIG. 9 is a graph of Allen Deviation (deg/hr) (Y-axis) vs. Tau (sec) (X-axis) with both the temperature and split frequency control.

The nonlinear FM modulated gyroscope was tested with a constant temperature control and split frequency drift to demonstrate the real-time application with no post processing. Under constant temperature control, as shown in FIG. 7, gyroscope drift is linearly correlated with frequency split drift. With the addition of active split frequency control, long-term drift is limited by amplitude noise associated with the coupling of amplitude noise to frequency noise. FIG. 8 shows the Allen deviation of the raw and linearly compensated response via frequency split drift. For the compensated response, stability is limited by the crude digital amplitude control. FIG. 9 shows a real time application of the Allen deviation with both temperature and split frequency control. As shown in FIG. 9, no post-processing is needed with temperature and split frequency control.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about −5 V to about 5 V should be interpreted to include not only the explicitly recited limits of from about −5 V to about 5 V, but also to include individual values, such as −3 V, 0 V, 3 V, etc., and sub-ranges, such as from about −2 V to about 3 V, etc.

In describing and claiming the examples disclosed herein, the singular forms "a", "an", and "the" include plural referents unless the context clearly dictates otherwise.

What is claimed is:

1. A nonlinear frequency modulated gyroscope, comprising:
   a degenerate-mode mechanical resonator with two or more modes, wherein the two or more modes are coupled via a Coriolis effect;
   positive feedback circuits for each mode of the degenerate-mode mechanical resonator, wherein the positive feedback circuits include an analog or digital automatic gain control circuit that maintains oscillations of each mode at a constant amplitude;
   a temperature control component, wherein the temperature control component includes a temperature sensor and heating elements; and
   a gyroscope controller, wherein the gyroscope controller is an application-specific integrated circuit, a field programmable gate array, or microcontroller;
   wherein the degenerate-mode mechanical resonator, the positive feedback circuits, and the temperature control component are subsystems of the nonlinear frequency modulated gyroscope.

2. The nonlinear frequency modulated gyroscope subsystem of claim 1, wherein the positive feedback circuit includes a phase shifter circuit connected to a comparator circuit that adjusts a phase output and an amplitude output of each mode of the degenerate-mode resonator to self-oscillate.

3. The nonlinear frequency modulated gyroscope subsystem of claim 2, wherein the phase shifter circuit includes an active all-pass filter, a passive phase shifter, or a high-pass filter.

4. The nonlinear frequency modulated gyroscope subsystem of claim 2, wherein the comparator circuit includes an attenuator to adjust the amplitude output of the nonlinear frequency modulated gyroscope to a value to maintain a target amplitude.

5. The nonlinear frequency modulated gyroscope subsystem of claim 4, wherein the comparator receives a voltage ranging from about −5 V to about 5 V and the value is equal to or great than 0 V.

6. The nonlinear frequency modulated gyroscope subsystem of claim 2, wherein the analog or digital automatic control circuit adjusts the amplitude output of the comparator circuit by using a proportional-integral (PI) controller.

7. The nonlinear frequency modulated gyroscope subsystem of claim 1, wherein the temperature control component is attached to an interface electronics board or a chip carrier.

8. The nonlinear frequency modulated gyroscope of claim 1, wherein the temperature sensor is a platinum resistance temperature device or a thermistor.

9. The nonlinear frequency modulated gyroscope subsystem of claim 1, wherein the heating elements are power resistors.

10. The nonlinear frequency modulated gyroscope subsystem of claim 1, wherein the degenerate-mode mechanical resonator is attached to a chip carrier that is connected to an interface electronics circuit board.

11. The nonlinear frequency modulated gyroscope subsystem of claim 1, wherein the degenerate-mode mechanical resonator is enclosed in a vacuum chamber.

12. The nonlinear frequency modulated gyroscope subsystem of claim 1, wherein the degenerate-mode mechanical resonator includes a plurality of shaped combs with control loops in an amount equal to a number of modes to maintain a mean or an average frequency of each mode at a constant value or the plurality of shaped combs with at least one control loop to maintain a difference in a mean or an average modal frequency at a constant value.

13. A nonlinear frequency modulated gyroscope system, comprising:
- a degenerate-mode mechanical resonator, wherein at least two of the modes of the degenerate-mode mechanical resonator can be coupled via a Coriolis effect;
- positive feedback circuits to match with every mode of the degenerate-mode mechanical resonator, wherein the positive feedback circuits include an analog or digital automatic gain control that maintains oscillations of each mode at a constant amplitude;
- a temperature control component, wherein the temperature control component includes a sensor and heating elements; and
- a gyroscope controller, wherein the gyroscope controller is an application-specific integrated circuit, a field programmable gate array, or microcontroller;
- wherein the degenerate-mode mechanical resonator, the positive feedback circuits, and the temperature control component are subsystems of the nonlinear frequency modulated gyroscope system.

14. The nonlinear frequency modulated gyroscope system of claim 13, wherein the positive feedback circuit includes a phase shifter circuit connected to a comparator circuit that adjust a phase output and an amplitude output of each mode of the degenerate-mode resonator to self-oscillate.

15. The nonlinear frequency modulated gyroscope system of claim 14, wherein the comparator includes an attenuator to adjust the amplitude output of the nonlinear frequency modulated gyroscope to a value to maintain a target amplitude.

* * * * *